(12) United States Patent
Elhassid et al.

(10) Patent No.: US 10,490,814 B2
(45) Date of Patent: Nov. 26, 2019

(54) METHOD FOR THE USE OF SLURRIES IN SPRAY PYROLYSIS FOR THE PRODUCTION OF NON-HOLLOW, POROUS PARTICLES

(71) Applicant: Washington University, St. Louis, MO (US)

(72) Inventors: Dror Elhassid, St. Louis, MO (US); William Moller, St. Louis, MO (US); Richard Axelbaum, St. Louis, MO (US); Miklos Lengyel, St. Louis, MO (US); Gal Atlas, St. Louis, MO (US)

(73) Assignee: Washington University, St. Louis, MO (US)

( * ) Notice: Subject to any disclaimer, the term of this patent is extended or adjusted under 35 U.S.C. 154(b) by 22 days.

(21) Appl. No.: 15/658,014

(22) Filed: Jul. 24, 2017

(65) Prior Publication Data

US 2017/0324088 A1 Nov. 9, 2017

Related U.S. Application Data

(62) Division of application No. 14/775,231, filed as application No. PCT/US2014/026641 on Mar. 13, 2014, now Pat. No. 9,748,567.

(60) Provisional application No. 61/780,059, filed on Mar. 13, 2013.

(51) Int. Cl.

| | |
|---|---|
| *H01M 4/485* | (2010.01) |
| *H01M 4/505* | (2010.01) |
| *H01M 4/525* | (2010.01) |
| *H01M 4/58* | (2010.01) |
| *H01M 10/0525* | (2010.01) |
| *B01J 2/02* | (2006.01) |
| *C01D 15/02* | (2006.01) |
| *C01G 53/00* | (2006.01) |
| *C01G 1/02* | (2006.01) |
| *C01G 45/12* | (2006.01) |
| *C01G 51/00* | (2006.01) |

(52) U.S. Cl.
CPC ............ *H01M 4/485* (2013.01); *B01J 2/02* (2013.01); *C01D 15/02* (2013.01); *C01G 1/02* (2013.01); *C01G 53/50* (2013.01); *H01M 4/505* (2013.01); *H01M 4/525* (2013.01); *H01M 4/5825* (2013.01); *H01M 10/0525* (2013.01); *C01G 45/1228* (2013.01); *C01G 45/1257* (2013.01); *C01G 51/42* (2013.01); *C01G 51/50* (2013.01); *C01G 51/56* (2013.01); *C01G 53/42* (2013.01); *C01G 53/56* (2013.01); *C01P 2002/32* (2013.01); *C01P 2002/52* (2013.01); *C01P 2004/03* (2013.01); *C01P 2004/30* (2013.01); *C01P 2004/45* (2013.01); *C01P 2004/61* (2013.01); *C01P 2004/62* (2013.01); *C01P 2004/80* (2013.01); *C01P 2004/82* (2013.01); *C01P 2006/11* (2013.01); *C01P 2006/12* (2013.01); *C01P 2006/16* (2013.01); *C01P 2006/40* (2013.01)

(58) Field of Classification Search
None
See application file for complete search history.

(56) References Cited

U.S. PATENT DOCUMENTS

| | | |
|---|---|---|
| 5,958,361 A | 9/1999 | Laine et al. |
| 2002/0006470 A1 | 1/2002 | Eberspacher et al. |
| 2006/0245999 A1 | 11/2006 | Shen et al. |
| 2010/0230841 A1 | 9/2010 | Hampden-Smith et al. |
| 2012/0128577 A1 | 5/2012 | Ellsworth |
| 2012/0282522 A1 | 11/2012 | Kxelbaum et al. |

FOREIGN PATENT DOCUMENTS

| | | |
|---|---|---|
| JP | H04-298234 A | 10/1992 |
| JP | 2000-340226 A | 12/2000 |
| WO | 2012/155196 A1 | 11/2012 |

OTHER PUBLICATIONS

Extended European Search Report for EP Application 14773759.7 dated Jul. 28, 2016.
International Search Report and Written Opinion for PCT/US2014/026641 dated Jul. 10, 2014.
Jain et al., "Morphology of Single-Component Particles Produced by Spray Pyrolysis", Aerosol Science Technology, 1997, pp. 575-587, Ch. 27.
Ju et al., "Effects of Types of Drying Control Chemical Additives on the Morphologies and Electrochemical Properties of Li4Ti5O12 Anode Powders Prepared by Spray Pyrolysis", Journal of Alloys and Compounds, Sep. 17, 2010, pp. 913-916, vol. 506, Issue 2.
Koo et al., "Effects of Amide Types DCCAs on the Properties of Y2O3: Eu phosphor Powders with Spherical Shape and Fine Size", Journal of the Ceramic Society of Japan, Sep. 2008, pp. 955-959, vol. 116, No. 1357.
Lee et al., "Preparation of Ultrafine Barium Titanate Powder by Slurry Spray Pyrolysis", Journal of the Korean Ceramic Society, 2009, pp. 137-145, vol. 46, No. 2.
Lengyel et al., "Development of a Scalable Spray Pyrolysis Process for the Production of Non-Hollow Battery Materials", Journal of Power Sources, Nov. 15, 2014, pp. 175-178, vol. 266.

(Continued)

*Primary Examiner* — Sarah A. Slifka
(74) *Attorney, Agent, or Firm* — Armstrong Teasdale LLP

(57) ABSTRACT

A process for preparing a metal oxide-containing powder that comprises conducting spray pyrolysis that comprises aerosolizing a slurry that comprises solid-phase particles in a liquid that comprises at least one precursor compound, which comprises one or more metallic elements of at least one metal oxide, to form droplets of said slurry, and calcining the droplets to at least partially decompose the at least one precursor compound and form the metal oxide-containing powder having a non-hollow morphology.

13 Claims, 11 Drawing Sheets

(56) References Cited

OTHER PUBLICATIONS

Messing et al., "Ceramic Powder Synthesis by Spray Pyrolysis", Journal of the American Ceramic Society, Nov. 1993, pp. 2707-2726, vol. 76, Issue 11.

Ng et al., "Highly Reversible Lithium Storage in Spheroidal Carbon-Coated Silicon Nanocomposites as Anodes for Lithium-Ion Batteries", Angew. Chem. Int. Ed., Oct. 20, 2006, pp. 6896-6899, vol. 45, Issue 41.

Strobel et al., "Flame Aerosol Synthesis of Smart Nanostructured Materials", Journal of Materials Chemistry, Sep. 25, 2007, pp. 4743-4756, Issue 17.

Taniguchi et al., "Synthesis of Spherical LiMn2O4 Microparticles by a Combination of Spray Pyrolysis and Drying Method", Powder Technology, Feb. 12, 2008, pp. 228-236, vol. 181, Issue 3.

Wang et al., "Photoluminescence Optimization of Luminescent Nanocomposites Fabricated by Spray Pyrolysis of a Colloid-Solution Precursor", Journal of the Electrochemical Society, 2007, pp. J121-J128, vol. 154, Issue 4.

Zhang et al., "Spray Pyrolysis Synthesis of Mesoporous Lithium-Nickel-Manganese-Oxides for High Energy Li-Ion Batteries", Journal of the Electrochemical Society, Apr. 13, 2012, pp. A834-842, vol. 159 Issue 6.

METHOD FOR THE USE OF SLURRIES IN SPRAY PYROLYSIS FOR THE PRODUCTION OF NON-HOLLOW, POROUS PARTICLES

CROSS-REFERENCE TO RELATED APPLICATIONS

The present application is a divisional application claiming the benefit of U.S. Ser. No. 14/775,231, which is the U.S. National Phase application of PCT/US2014/026641, filed on Mar. 13, 2014, which claimed the benefit of U.S. Provisional Application 61/780,059, filed Mar. 13, 2013, each of which is incorporated herein by reference in their entireties.

STATEMENT REGARDING FEDERALLY SPONSORED RESEARCH OR DEVELOPMENT

This invention was made with government support under grant number 0928964 awarded by the National Science Foundation. The government has certain rights in the invention.

FIELD OF THE INVENTION

The invention is generally related to spray pyrolysis methods for the production of powders. More specifically, the invention relates to the spray pyrolysis of a slurry comprising a mixture of solid material and liquid to produce particles with controlled or reduced hollowness or a non-hollow morphology.

BACKGROUND OF INVENTION

Spray pyrolysis is a robust and cost effective way of producing micron and nanoscale powders. The degree of control over the morphology of the resulting particles, however, has been limited. In particular, hollow spheres with a porous and fine structured shell are typically produced, especially when the desired particles are a few microns in size or more. "Morphology of single-component particles produced by spray pyrolysis," S. Jain, D. J. Skamser, T. T. Kodas, *Aerosol Sci. Technol.*, 27, 575 (1997); "Ceramic powder synthesis by spray pyrolysis," G. L. Messing, S. C. Zhang, G. V. Jayanthi, *J. Am. Ceram. Soc.*, 76, 2707 (1993). Such a structure is undesirable for applications such as energy storage where the packing density of a material is a key performance parameter. While several methods have been developed to address the problem of hollow spheres, each has its own shortcomings and limitations.

For example, certain methods have utilized temperatures that exceed the melting point of at least one constituent or compound of the final, "fired" product, or evaporating the pyrolyzed material and then reconstructing a solid particle from vapor phase. "Ceramic powder synthesis by spray pyrolysis," G. L. Messing, S. C. Zhang, G. V. Jayanthi, *J. Am. Ceram. Soc.*, 76, 2707 (1993); "Flame spray pyrolysis: An enabling technology for nanoparticles design and fabrication," W. Y. Teoh, R. Amal, L. Maedler, *Nanoscale*, 2 (8), 1324 (2010); "Flame aerosol synthesis of smart nanostructured materials," R. Stroble, S. E. Pratsinis, *J. Mater. Chem.*, 17 (45), 4743 (2007). Although addressing the hollowness, at least in part, these processes tend to result in non-porous or low porosity particles and tend to have undesirable phases and/or compounds due the high temperatures used during production.

Another method involves the use of drying control chemical additives (DCCA). "Effects of amide types DCCAs on the properties of $Y_2O_3$: Euphosphor powders with spherical shape and fine size," H. Y. Koo, S. H. Lee, C. Y. Kang, *J. Ceram. Soc. Jpn.*, 116 (1357), 955 (2008); "Effects of types of drying control chemical additives on the morphologies and electrochemical properties of $Li_4Ti_5O_{12}$ anode powders prepared by spray pyrolysis," S. H. Ju, C. Y. Kang, *J. Alloys Compd.*, 506 (2), 913 (2010). The inclusion of such additives with the precursor was reported to affect the morphology of particles and prevent hollow structure for particles of up to one or two microns but have not been effective for larger particle sizes. In addition, these additives are generally expensive and present the risk of contaminating the final product.

Yet another method involves spray drying of milled product. "Synthesis of spherical $LiMn_2O_4$ microparticles by a combination of spray pyrolysis and drying method," I. Taniguchi, N. Fukuda, M. Konarova, *Powder Technol.*, 181 (3), 228 (2008). This multi-step path offers the advantage of relatively large secondary particle, but the particles consist of multiple fragments with no bonding connection or structural strength. Although this problem may be overcome by the addition of a binder to the sprayed solution, the binder itself may act as a contaminant in the product and may prevent intimate contact between fragments.

Still further, limited amounts of nanoparticles have been included in the precursor solution to serve as seeds that promote heterogeneous nucleation during the pyrolysis stage. "Photoluminescence optimization of luminescent nanocomposites fabricated by spray pyrolysis of a colloid-solution precursor," W. Wang, W. Widiyastuti, T. Ogi, I. W. Lenggoro, K. Okuyama, *Chem. Mater.*, 19 (7), 1723 (2007). The non-hollow particles produced by this method were only in the submicron size range. Furthermore, this method incorporates a large volume of non-active colloids into the final product, which is an undesirable feature for most applications.

In view of the foregoing, a need still exists for a method of producing non-hollow, porous particles of relatively large size (e.g., larger than one micron) without introducing undesirable impurities or phases.

SUMMARY OF INVENTION

In one embodiment, the present invention is directed to a process for preparing a metal oxide-containing powder. The process comprising conducting spray pyrolysis that comprises:

(a) aerosolizing a slurry that comprises solid-phase particles in a precursor solution to form droplets that comprise the precursor solution and one or more of the solid-phase particles, wherein (i) the solid-phase particles have a mean size that is in a range of about 10 nm and 50 μm, and (ii) the precursor solution comprises at least one precursor compound dissolved or suspended in a solvent, wherein the at least one precursor compound comprises one or more metallic elements of at least one metal oxide, and (iii) the slurry has a total mass fraction of solid-phase particles to metal oxide-containing powder that is in a range of about 2% to about 75%;

(b) evaporating the solvent in the droplets to form dried droplets that comprise the at least one precursor compound and one or more solid-phase particles; and (c) calcining the dried droplets to at least partially decompose the at least one precursor compound and form the metal oxide-containing powder, wherein the metal oxide-containing powder comprises product particles that comprise the at least one metal oxide, wherein the product particles have (i) a mean size that is in a range of about 100 nm to about 500 µm and (ii) a mean hollowness, which is less than a mean hollowness of particles of about the same mean size prepared by an otherwise identical spray pyrolysis process conducted except for the absence of seed particles in the aerosol.

In another embodiment, the present invention is directed to a material comprising a plurality of mesoporous, metal oxide-containing secondary particles with a non-hollow morphology and a mean size that is in a range of about 1 µm to about 15 µm, wherein the secondary particles comprise primary particles with a mean size that is in a range of about 50 nm to about 500 nm.

In yet another embodiment, the present invention is directed to a process for preparing a powder, the process comprising conducting spray pyrolysis that comprises:

(a) aerosolizing a slurry that comprises solid-phase particles in a liquid comprising at least one precursor compound to form droplets that comprise the liquid and one or more of the solid-phase particles, wherein (i) the solid-phase particles have a mean size that is in a range of about 10 nm and 50 µm, and (ii) the slurry has a total mass fraction of solid-phase particles to metal oxide-containing powder that is in a range of about 2% to about 75%; and (b) calcining the droplets to at least partially decompose the at least one precursor compound and form powder, wherein the powder comprises product particles that comprise the decomposition product(s) of the at least one precursor compound, wherein the product particles have (i) a mean size that is in a range of about 100 nm to about 500 µm and (ii) a mean hollowness, which is less than a mean hollowness of particles of about the same mean size prepared by an otherwise identical spray pyrolysis process conducted except for the absence of seed particles in the aerosol.

In still another embodiment, the present invention is directed to a material comprising a plurality of mesoporous secondary particles with a non-hollow morphology and a mean size that is in a range of about 1 µm to about 15 µm, wherein the secondary particles comprise primary particles with a mean size that is in a range of about 50 nm to about 500 nm.

DETAILED DESCRIPTION OF INVENTION

A. Particles Prepared Using Slurry Spray Pyrolysis

The present invention is directed to a method of producing powders through the spray pyrolysis of a slurry and the resulting product powder. As used herein, the term "spray pyrolysis" is intended to include essentially material fabrication method involving spraying a liquid-containing material in conjunction with the thermal decomposition of one or more compounds in the liquid-containing material. By way of example, the term spray pyrolysis may encompass a process occurring at relatively low temperature (e.g., 450° C. or less) that utilize equipment commonly referred to as spray drying equipment. Similarly, spray pyrolysis may also encompass processes referred to as spray roasting.

1. Non-Hollow Product Particles

Figure 1:
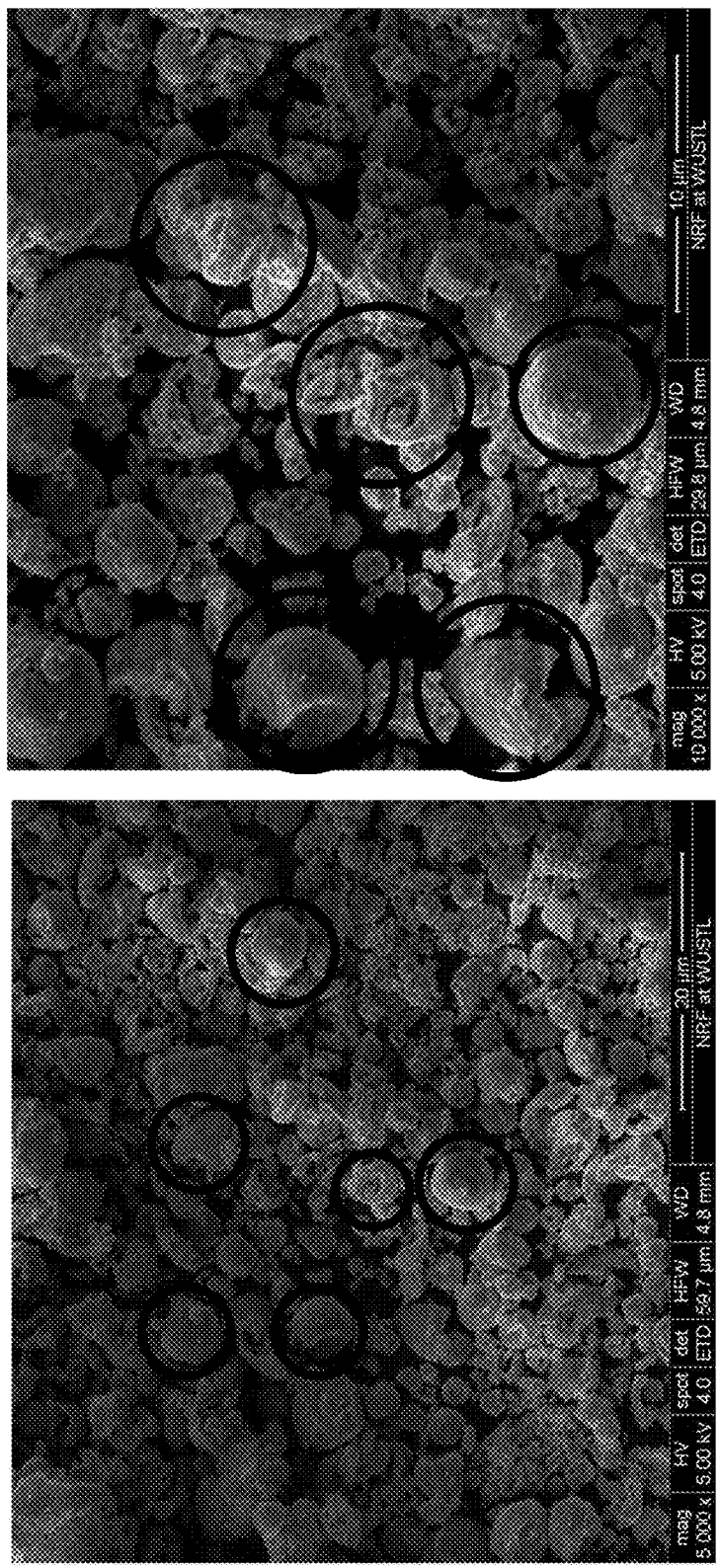
FIG. 1 contains scanning electron microscope images of particles of $0.5Li_2MnO_3 \cdot 0.5LiNi_{0.333}Mn_{0.333}Co_{0.333}O_2$ made using spray pyrolysis after annealing at 900° C. that were generated with a non-slurry method. The particles exhibit a significant presence of hollow spheres as indicated by the circles highlighting deformed spheres/broken shells caused by the interior hollowness.
Figure 2:
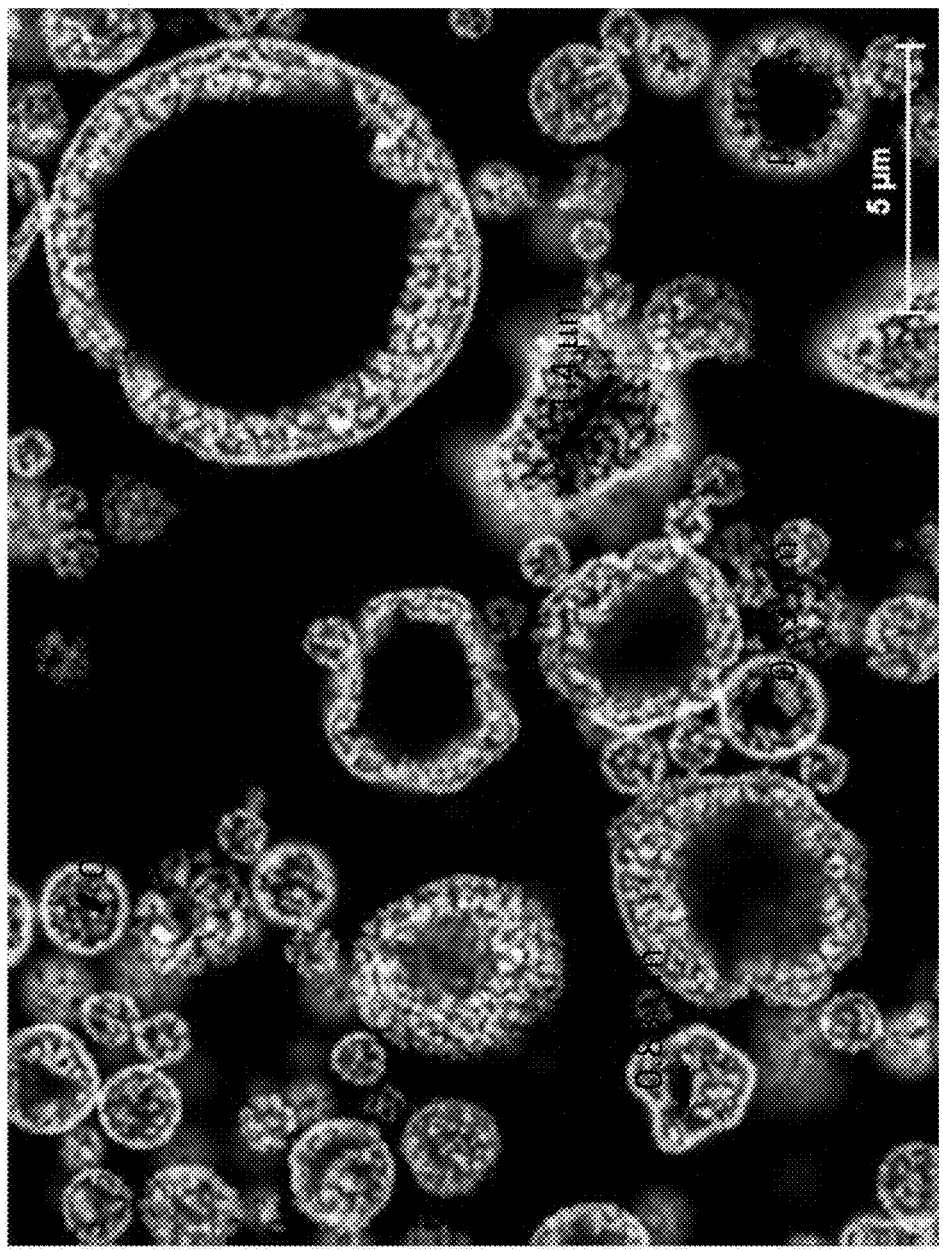
FIG. 2 is a scanning electron microscope image of particle cross-sections produced by microtome displaying a hollow-sphere morphology.
Figure 6:
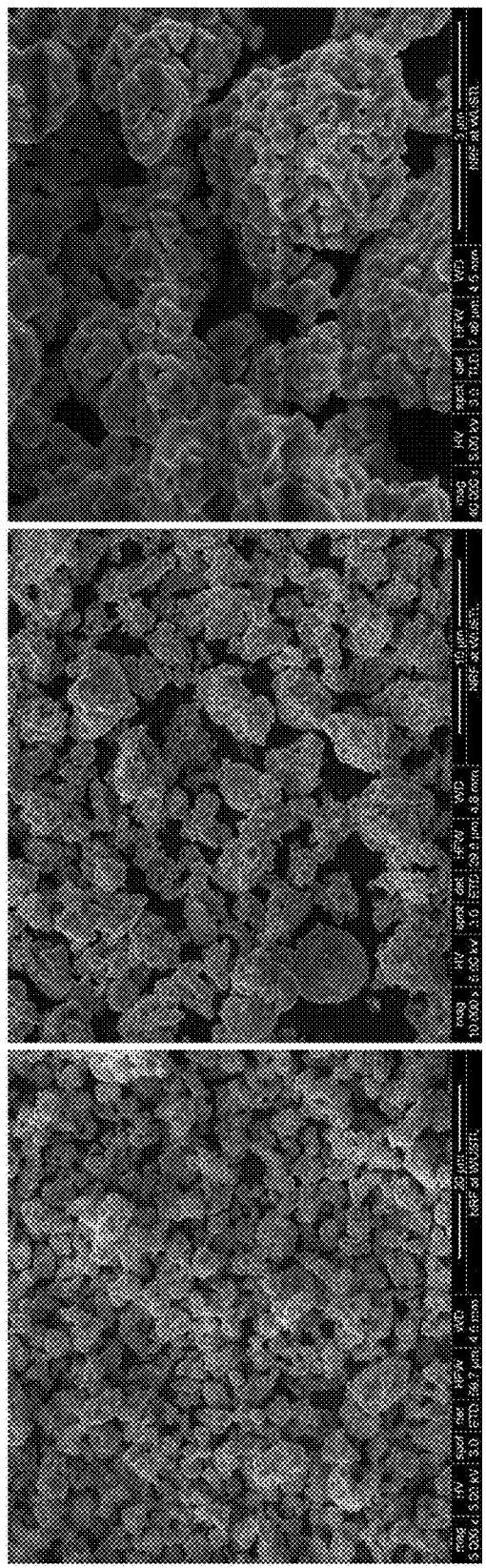
FIG. 6 is contains scanning electron microscope images of the product powder of $0.5Li_2MnO_3 \cdot 0.5LiNi_{0.333}Mn_{0.333}Co_{0.333}O_2$ made using slurry spray pyrolysis after annealing at 900° C.
Figure 7:
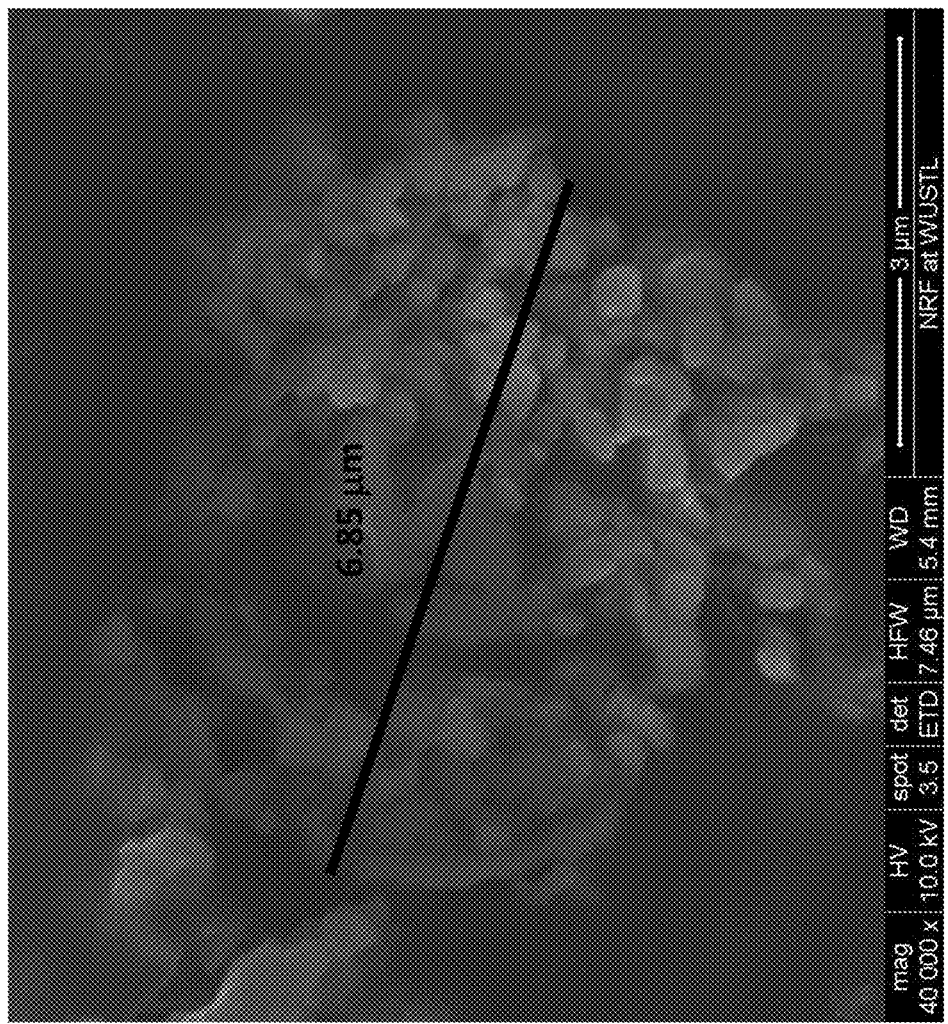
FIG. 7 is a scanning electron microscope image of a cross section of the product powder of $(0.5Li_2MnO_3 \cdot 0.5LiNi_{0.333}Mn_{0.333}Co_{0.333}O_2$ made using slurry spray pyrolysis annealing at 900° C. embedded in resin.

Advantageously, the slurry spray pyrolysis method of the present invention may be used to produce non-hollow, porous particles or powders. Although relatively small non-hollow particles may be produced, of particular advantage is the ability to produce non-hollow particles that are relatively large (e.g., >about 1 micron) in size. As disclosed above, hollow morphology is a common characteristic of particles/powders made using conventional spray pyrolysis techniques, especially as particle size increases above about 1 micron. SEM images of particles with hollow morphologies are provided in FIGS. 1 and 2. The dented spheres in FIG. 1 are typical of the morphology when the particles are hollow, and the microtome of FIG. 2 shows the hollow interior. In contrast, FIGS. 6 and 7 are SEM images of particles of the present invention having non-hollow morphologies. The term "size" as used herein means the largest cross-sectional dimension of a particle. So, if a particle is spherical, the size would be equivalent to the diameter of the particle.

The term "hollowness" with respect to the product particle(s) is the relationship between the hollow or void region/space/volume of a particle (excluding what is conventionally considered to be porosity) and the total volume of the particle assuming the particle is solid particle. In general, a particle is considered to be non-hollow or to have a non-hollow morphology if it does not have a central void (i.e., a "shell-like" morphology), or if a void is present, the void constitutes less than about 10% of the total volume of a particle. In certain embodiments of the present invention, the process is controlled such that the resulting particles have a hollowness that is less than about 60%, about 40%, about 20%, about 10%, about 5%, about 2%, or about 1%.

The degree of hollowness of a particle or quite a few particles (i.e., a sample of a powder) may be determined according to a method similar to the foregoing. Specifically, the particle or powder sample may be embedded in a resin, sections cut with a microtome, and the cut sections observed with SEM/TEM microscopy. The particle is considered to be hollow if it has a void, or in the case of a powder, a vast majority of the particles (e.g., 75% or more of the particles) have voids, that exceed 300 nm in size for a particle size (or particles with a mean particle size) greater than about 1.5 μm (see, e.g., FIG. 2).

With respect to powders it may be desirable to utilize methods for determining and/or approximating the degree of hollowness of the particles that is even quicker and easier than the foregoing. In particular, the hollowness of the particles making up a powder may be so significant that it affects certain macroscopic properties of the powder such as the tap or bulk density of the material. It is understood that the bulk density of a material is affected by other various physical and chemical properties such as secondary particle size, primary particle size, surface chemistry and surface morphology. Nevertheless, it is believed that hollowness so significantly affects bulk density that the effects of such other characteristics may be ignored. Thus, one may empirically determine the bulk density or a range of bulk densities for a powder of a particular composition comprising hollow particles and compare it to that of particles of the present invention that are non-hollow. For example, it has been determined that $xLi_2MnO_3 \cdot (1-x)LiMn_{0.33}Ni_{0.33}Co_{0.33}O_2$ in the form of hollow particles has a tap density in a range of about 0.4 to about 0.6 g/cm$^3$. So, if the tap density of a powder of such a composition is greater than about 0.6 g/cm$^3$ without any additional post-spray pyrolysis processing (e.g., grinding, jet milling, pressing), it is considered to be a powder in which the vast majority of the particles have a non-hollow morphology.

To be clear, if a particle or powder determined to be hollow using any one of the methods set forth herein, it shall be considered to be hollow or to have a hollow morphology.

2. Porous Product Particles

As indicated above, in addition to being non-hollow or having a controlled or reduced amount of hollowness, the particles of the present invention may be, and are typically produced in a manner such that they are, considered to be porous. To be clear, the process of the present invention may be performed (e.g., by, inter alia, selecting a particular composition) to produce non-hollow or controlled or reduced hollowness that are non-porous. Porosity is distinct from hollowness. The term "porosity" refers to the distinguishable pore sizes observed in the particles. The pore size distribution may be plotted as a probability density function of the frequency of intraparticle voids or pores, where most pores would be centered around a Gaussian-type mean pore size. Thus, another way to determine if particle(s) are hollow is to determine if there exists one or more distinctly larger voids (e.g., void >2 σ larger) than the mean pore size. By way of example, the mean intraparticle void size of pores in $xLi_2MnO_3 \cdot (1-x)LiMn_{0.33}Ni_{0.33}Co_{0.33}O_2$ materials is typically in a range of about 50 nm to about 150 nm. Thus, if there is an intraparticle void size significantly larger than the mean (e.g., 50 nm larger than the mean pore size), that is indicative of the particle(s) being hollow. Void size distributions may be measured using SEM images or BET pore size distribution measurements.

In certain embodiments, the pore structures in the particles include nanopores (less than 2 nm), mesopores (between 2 nm and 50 nm), and macropores (above 50 nm). The interparticle pore spacing (the space between primary particles, see below) is within the range of from few nanometers (e.g., 2 nm) to tens of nanometers (e.g., 100 nm) and the porosity is distributed uniformly within the particle. This type of porosity may be referred as to as "mesoporous."

3. Secondary Particles and Primary Particles

In some embodiments, the product particles are made of smaller (sub-micron) "primary" particles that are firmly connected together to form larger (micron-scale) "secondary" particles (i.e., the product particles). Advantageously, this method for producing non-hollow product or secondary particles allows for lower operating temperatures, which allows for better control over phase and primary particle size than utilizing temperatures that exceed the melting point of at least one constituent or compound of the product particles (as previously known, above). Lower operating temperatures may be used because the materials only need to be subjected to temperatures sufficient for precursor decomposition. For example, the process may be controlled such that the size of the primary particles is in the range of about 1 nanometer to about 2 micrometers and the size of the secondary particles in the range of about 10 nm to about 100 μm (see, e.g., FIG. 2). Further, the process may be controlled such that the mean size of the primary particles is in the range of about 1 nm to about 500 nm and the mean size of the secondary particles is in the range of submicron (e.g., about 0.1 μm) to microns (e.g., 20 μm). In yet another embodiment, the mean size of the primary particles is in the range of about 500 nm to about 2 μm and the mean size of the secondary particles is in the range of about 1 μm to about 100 μm. Still further, the process may be controlled such that the standard deviation with respect to the median value for the secondary particle size is in the range about 0.5 to about 10 μm.

D. Slurry Spray Pyrolysis Method

Figure 3:
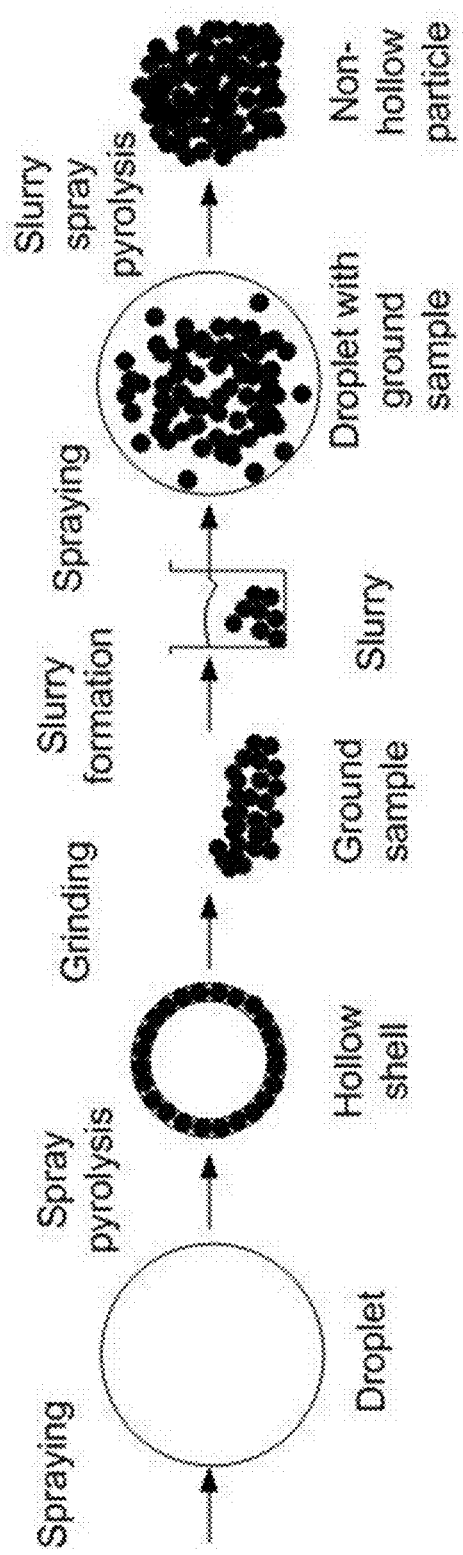
FIG. 3 is a diagram depicting the processing of materials in accordance with an embodiment of the present invention.
Figure 4:
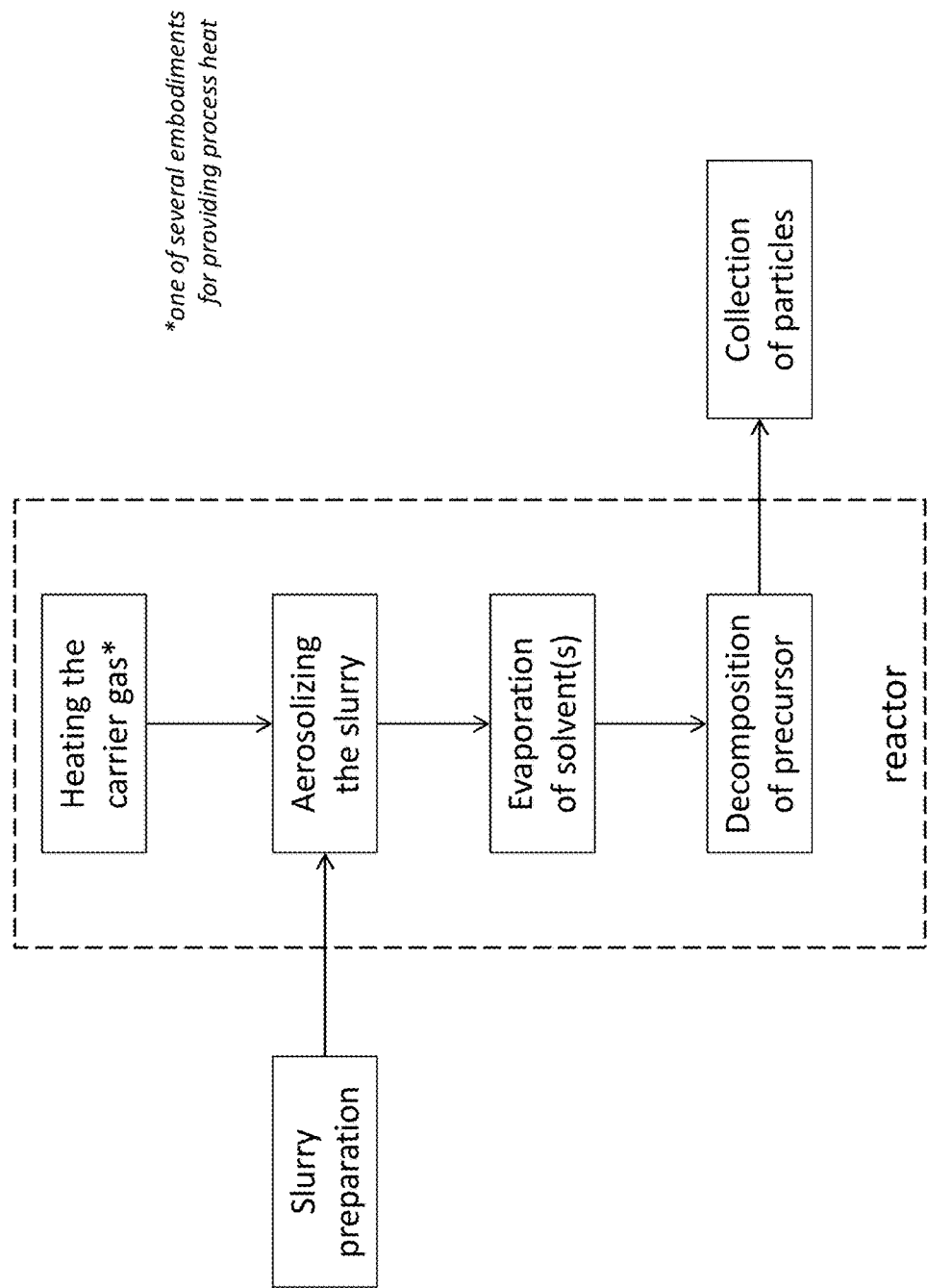
FIG. 4 is a process flow block diagram of an embodiment of the present invention.

Referring to FIGS. 3 and 4, the method of the present invention comprises: aerosolizing a slurry into droplets, wherein the slurry comprises solid particles in a precursor solution, evaporating solvent(s) from the droplets, and calcining the dried droplets to decompose precursor compounds into pyrolysis products to form product particles. Upon formation of the particles they are typically collected from the pyrolysis gas stream.

1. Slurry Preparation

The slurry used in the process comprises solid particles in a precursor liquid or precursor solution, wherein the precursor liquid or solution contains at least one precursor compound that will decompose during the pyrolysis process. The term "slurry" as used herein is not intended to imply, nor does it exclude, that the particles in the liquid is/form a stable and/or thick or viscous suspension. The slurry or particle-liquid mixture or suspension may be stable (i.e., it tends not to settle under the influence of gravity without agitation) or may not be stable (i.e., it tends to settle under the influence of gravity without agitation). The term "precursor liquid" is used herein to differentiate a slurry component in which a precursor compound itself is a liquid, and not a solid dissolved in a liquid solvent.

a. Solid-Phase Particles

The slurry comprises solid-phase particles in a liquid precursor or precursor solution, wherein the liquid fraction includes precursor compounds that will decompose during spray pyrolysis. The terms "seed particles" and "solid-phase particles" as used herein refer to particles added to a precursor liquid or a precursor solution or to any other liquid to create a slurry or suspension. Said particles may be what is generally considered to be solid, what is generally considered to be hollow, or a combination of both solid and hollow particles. To be clear, the foregoing use of the terms "solid" and "hollow" with respect to the solid-phase or seed particles are not intended to address the porosity of the particles. If hollow particles are used, however, it is preferred that the amount and/or hollowness thereof and/or the process is controlled such that the hollowness of the resulting particles is less than about 60%, about 40%, about 20%, about 10%, about 5%, about 2%, or about 1%. Additionally, the modifier "seed" does not imply, nor does it exclude, that the particle acts to promote nucleation in any point in the process.

The solid-phase particles may have identical or different composition to that of the liquid precursor. In certain embodiments, a benefit of the solid-phase particles is that they tend to fill in intraparticle voids, particularly for product particles that have a mean secondary particle size that is less than 2 μm with a relatively narrow size distribution (e.g., a standard deviation of 250 nm). Typically, it is not necessary for the solid-phase particles have a particular or preferred morphology or crystalline shape because they are not usually acting as seeding nuclei. As such, unless nucleation is desired function, the solid-phase particles may have any crystallographic structure. The solid-phase particles may be prepared according to any appropriate method(s), including spray pyrolysis, and, if desired, may be subjected to various processing operations such as milling or grinding and/or screening to obtain a desired mean size and/or size distribution. As indicated above, if it desired to increase bulk density of the powder, it would typically be of benefit for the solid-phase particles to have a mean size that is less than about the mean size of the secondary particles of the product particles to facilitate the filling of intraparticle voids.

Exemplary solid-phase particles include the following: silicon nanoparticles; titanium nanoparticles; lithium transitional metal oxides (e.g., lithium, nickel, manganese cobalt oxides); and carbon. More generally, the solid-phase particles may comprise any metallic or non-metallic solid material or compound such as oxides (e.g., $Y_3Al_5O_{12}$, $Y_2O_3$, $Gd_2O_3$, which are phosphors; oxide compositions within systems such as Y—Ba—Cu—O, Bi—Sr—Ca—Cu—O, Ba—Ca—Ti—O; and various other oxide such as $ZrO_2$; $SrTiO_3$; $Ba_{0.86}Ca_{0.14}TiO_3$; $Al_2O_3$; $Fe_2O_3$; $Ta_2O_5$; $La_2O_3$; $Y_2O_3$; $CeO_2$; $Sm_2O_3$; $TiO_2$; $Ba_2O_3$; CuO; MgO; NiO; $Mn_3O_4$; $SnO_2$; $V_2O_5$; PdO; $PbO_2$, and $Co_3O_4$); phosphates; nitrides (e.g., BN); halides, and metals (e.g., Ag, Cu, Ni), that are solid at temperature(s) applicable to the method of the present invention (e.g. room temperature to about 1500° C.).

b. Precursor Solution

In a precursor solution, solid precursor compounds are dissolved or suspended in a solvent. Solvents or mixtures of solvents include, but are not limited to, water, alcohols (ethanol, methanol, etc.), and mixtures thereof. In one embodiment, precursor compounds are selected such that they decompose into a pyrolysis product with the same are quite similar composition as the solid particles in the slurry, generating a product powder with a uniform chemical composition. In another embodiment, precursor compounds are selected such that they decompose into a pyrolysis product with a different composition as the solid particles in the slurry (i.e., in terms relative amounts of elements and/or compounds, and/or different elements and/or compounds) thereby generating a product powder with a non-uniform chemical composition (typically referred to as a "core-shell" particles). Examples of precursor compound include, but are not limited to: nitrates and acetates. The following is a more specific but non-exhaustive list of exemplary precursor compounds that may be dissolved or suspended in a solvent: lithium nitrate, nickel nitrate, manganese nitrate, cobalt nitrate, sodium nitrate, aluminum nitrate, calcium nitrate, potassium nitrate, rubidium nitrate, caesium nitrate, chromium nitrate, iron nitrate, titanium chloride, tin chloride, zinc nitrate, cadmium nitrate, cupper nitrate, barium nitrate, sodium hydroxide, magnesium bromide, lithium acetate, manganese acetate. More generally, the precursor compound(s) may be any metallic or non-metallic sulfate, carbonate, hydroxide, phosphate, chalcogenide, halogenide, silicate, or organic compound that may be dissolved, not dispersed, in an organic (protic or aprotic) or inorganic solvent (e.g., water, ethanol, acetone, tetrahydrofurane, benzene, toluene, etc.) without precipitate formation in the solvent. It is understood that the solubility of certain metals in certain solvents (e.g., aluminum) may depend on the pH of an aqueous solution.

c. Exemplary Uniform Composition Particles

Examples of uniform composition particles include, but are not limited to $Li_xMO_y$, wherein M is selected from Al, Ni, Co, Mn, Mg, Fe, Cu, Zn, Cr, Ag, Ca, Na, K, In, Ga, Ge, V, Mo, Nb, Si, Ti, Zr and x and y depend on the oxidation state of the incorporated metals); $Mn_uO_v$ and $Co_uO_v$, wherein u and v depend on the oxidation state of Mn. More specifically, without restricting the application of the current invention, additional examples include: $LiFePO_4$; $LiMn_{1/3}Ni_{1/3}Co_{1/3}O_2$; $zLi_2MnO_3\cdot(1-z)LiNi_{1/3}Mn_{1/3}Co_{1/3}O_2$ (where z=0-1); $zLi_2MnO_3\cdot(1-z)LiNi_{1/2}Mn_{1/2}O_2$ (where z=0-1); $Li_4Ti_5O_{12}$; $LiMnO_2$; $LiNi_{0.5}Mn_{1.5}O_4$; $Li_2MnO_3$; $LiNiPO_4$. More generally, the product particles may comprise any metallic or non-metallic solid material or compound such as oxides (e.g., $Y_3Al_5O_{12}$, $Y_2O_3$, $Gd_2O_3$, which are phosphors; oxide compositions within systems such as Y—Ba—Cu—O, Bi—Sr—Ca—Cu—O, Ba—Ca—Ti—O; and various other oxide such as $ZrO_2$, $SrTiO_3$; $Ba_{0.86}Ca_{0.14}TiO_3$; $Al_2O_3$; $Fe_2O_3$; $Ta_2O_5$; $La_2O_3$; $Y_2O_3$; $CeO_2$; $Sm_2O_3$; $TiO_2$; $Ba_2O_3$; CuO; MgO; NiO; $Mn_3O_4$; $SnO_2$; $V_2O_5$; PdO; $PbO_2$, and $Co_3O_4$); phosphates; nitrides (e.g., BN); halides, and metals (e.g., Ag, Cu, Ni).

In one embodiment, the solid phase particles and the precursor solution are selected to produce a lithium intercalating metal oxide of a uniform composition. More specifically, the material comprises lithium-containing metal oxide, which may be described according to the general chemical formula disclosed in U.S. Patent Application Publication No. 2009/0297947, Deng et al., entitled "Nano-sized Structured Layered Positive Electrode Materials to Enable High Energy Density and High Rate Capability Lithium Batteries"—$Li_{1+\alpha}(Ni_xCo_yMn_z)_{1-t}M_tO_{2-d}R_d$, wherein M is selected from Al, Mg, Fe, Cu, Zn, Cr, Ag, Ca, Na, K, In, Ga, Ge, V, Mo, Nb, Si, Ti, Zr, or a mixture of any two or more thereof, R is selected from F, Cl, Br, I, H, S, N, or a mixture of any two or more thereof, and $0 \le \alpha \le 0.50$; $0 < x \le 1$; $0 \le y \le 1$; $0 < z \le 1$; $0 \le t \le 1$; and $0 \le d \le 0.5$. In one embodiment, M is selected from the group consisting of Al, Mg, Fe, Cu, Zn, Cr, Ag, Ca, Na, K, Si, Ti, V, and combinations thereof, and R is selected from the group consisting of F, Cl, Br, I, and combinations thereof. Fluorine was reported to be a dopant that can contribute to cycling stability. In another embodiment, t=0, y=0, and d=0 such that the foregoing formula is reduced to $Li_{1+\alpha}Ni_xMn_zO_2$, wherein $0 \le \alpha \le 0.2$, $0.1 \le x \le 0.6$, $0.2 \le z \le 0.6$. In yet another embodiment, t=0 and d=0 such that the foregoing formula is reduced to $Li_{1+\alpha}Ni_xCo_yMn_zO_2$, wherein $0 \leq \alpha \leq 0.2$, $0.1 \leq x \leq 0.6$, $0.1 \leq y \leq 0.6$, $0.2 \leq z \leq 0.6$.

In some embodiments of the present invention the metal oxide compositions may have a composite crystal structure. Metal oxides with composite crystal structures may be represented by a two component chemical formula $xLi_2MO_3 \cdot (1-x)LiM'O_2$, wherein: M is one or more metallic ions having an average oxidation state of +4, and M' is one or more metallic ions have an average oxidation state of +3, and $0 \leq x \leq 1$. In an embodiment of the present invention, M is Mn and M' is selected from the group consisting of Mn, Ni, Co, Cr, and combinations thereof. In another embodiment, M is Mn and M' comprises at least one of Mn and Ni. In yet another embodiment, M is Mn and M' is Mn and Ni. In yet another embodiment, M is Mn and M' is Mn, Ni, and Co. Specific examples include $xLi_2MnO_3 \cdot (1-x)LiMn_{0.5}Ni_{0.5}O_2$, $xLi_2MnO_3 \cdot (1-x)LiCoO_2$, and $xLi_2MnO_3 \cdot (1-x)LiMn_{1/3}Ni_{1/3}Co_{1/3}O_2$. In further embodiments, for any of the foregoing formulas x may be in the following range $0.3 \leq x \leq 0.7$.

In addition to the selection of the metal oxide composition, the process of the present invention may be controlled to affect the crystalline structure of the metal oxides of the present invention. For example, the process may be controlled and the composition selected such that the metal oxide has a layered-layered composite crystalline structure. In fact, experimental results to date suggest that a metal oxide having a layered-layered structure has a desirable combination of capacity and cycleability. For example, $Li[Li_{(1/3-2a/3)}Ni_aMn_{(2/3-a/3)}]O_2$ ($0 < a < \frac{1}{2}$) synthesized at high temperature has delivered over 200 $mAhg^{-1}$ at a current density as high as $\frac{1}{10}$ C where 1 C=250 $mAg^{-1}$.

d. Exemplary Core-Shell Particles

Examples of such non-uniform composition particles include glass-metal nanocomposite particles (see, e.g., Japanese Patent No. JP 2005001978) and spheroidal carbon-coated silicon nanocomposite particles (see, e.g., "Highly Reversible Lithium Storage in Spheroidal Carbon-Coated Silicon Nanocomposites as Anodes for Lithium-Ion Batteries," See-How Ng, Jiazhao Wang, David Wexler, Konstantin Konstantinov, Zai-Ping Guo, and Hua-Kun Liu, Angew. Chem. Int. Ed., 45, 6896-6899 (2006)).

e. Chemical Reaction Between Solid-Phase and Precursor

In yet another embodiment, the slurry contains solid-phase particles and precursor compounds at least some of which are selected so that during the spray pyrolysis process a chemical reaction occurs between the solid-phase particles and the precursor solution or compounds. This chemical reaction yields a final product having a composition that is different from both the solid-phase particles and the decomposition product of the precursor solution (if it were decomposed in isolation). This type of pyrolysis is typically used to synthesize a product composition where one of the reactants is insoluble in solution. "Spray pyrolysis method for in situ production of graphene oxide based composites," Konstantinov, International publication No. WO 2012/155196 A1; "Preparation of ultrafine barium titanate powder by slurry spray pyrolysis," Jonk Ho Lee, Kang Heon Hur, and Jung Soo Lee, *Journal of the Korean Ceramic Society*, Vol. 46, No. 2, pp. 137-145 (2009).

f. Mass Ratio of Solid-Phase Particles in Slurry

The mass ratio of the solid phase particles in the slurry typically affects the morphology, the primary particle size, and the packing density of the product particles. This mass ratio may be calculated according to the following equation:

$$M_{sp} = M_{ss}/(M_{ss} + V_p \cdot \rho_p \cdot A)$$

wherein $M_{sp}$ is the mass ratio of the solid-phase particles from the slurry to the product mass, $M_{ss}$ is the mass of solid phase particles that were put into the slurry, $V_p$ is the volume of precursor solution used for producing the slurry, $\rho_p$ is the density of the precursor solution, and A is a mass conversion factor from precursor solution to a fully decomposed material. If the precursor is not fully decomposed in the pyrolysis process, the degree of decomposition would need to be accounted for in the value of A. Additional calculations are required if the solid-phase particles in the slurry lose a fraction of their mass during the pyrolysis phase (for example, if the solid-phase particles in the slurry were added when only partially decomposed and were then to further decompose during spray pyrolysis of the slurry). For this particular case the above equation will be modified as follows:

$$M_{sp} = M_{ss} \cdot A'/(M_{ss} \cdot A' + V_p \cdot \rho_p \cdot A)$$

wherein A' is estimated based upon the individual product and solid particles added to the slurry. For a fully decomposed solid seed particle A'=1, while for a partially decomposed samples A' is less than unity.

For example, the morphology may change from hollow spheres to non-hollow spheres to non-spherical aggregates as the ratio of the mass of solid-phase particles in the slurry to the total mass of the product powder (i.e., the "mass ratio") increases. A variety of other factors may also affect the morphology, including, for example, the precursor compound, solvent, aerosol heating profile, residence time, and particular atomization device. For example, the precursor composition will influence the product by affecting the crystallinity and size. The atomization device also tends to significantly influence particle morphology. Specifically, if the atomizers is selected to produce relatively small droplets (less than 1 micron in size), the particles tend to be less hollow. Whereas as size of droplets (above 1 micron) increase, the size of internal voids in the product particles tend to increase. Consequently, the ratio of the mass of solid-phase particles in the slurry to the total mass of the product powder that is required to achieve a given morphology is not constant across all process variations.

In an embodiment for a single or multicomponent slurry comprised of n distinct chemicals or chemical mixtures (i.e., n corresponds to the number of solid and liquid precursor compounds with at least one solid component, which can comprise a single chemical element or a number of chemical elements in the solid phase or dissolved in a solvent, such as water or organic solvents), a certain minimum level of solid component must be maintained/added in order to produce particles having a non-hollow morphology. For simplicity, the discussion is limited to a two-component mixture, A and B, which may be any chemical compound, but it is understood that this example does not restrict the application of the invention and the number of components. A may be either a suspension or a solid but for the current example A is in a solution and B is a solid. For such a mixture, there exists a minimum solid concentration necessary to obtain a non-hollow interior morphology for the particle. It is believed that a minimum solid concentration in the slurry is necessary to assure the resulting powder of product particles are non-hollow or have a non-hollow morphology. In general, for m number of solution based components and p number of solid phase components, the mixture of compounds will be non-hollow if, and only if $\Sigma_{j=1}^{P} x_j \geq a$, where $x_j$ is the mass fraction of component j, and a is an empirically obtained number that represents the minimum total mass fraction of solid-phase particles required to produce non-hollow product particles. For example, a=10% for the $xLi_2MnO_3 \cdot (1-x)LiMn_{0.33}Ni_{0.33}Co_{0.33}O_2$. This is true for uniform composition and multicomponent materials as well. The following equation can be used to determine the composition for materials where the composition of the seed particles is different than the composition of the precursor particles. It is possible to have more than one type of solid-phase particles and more than one type of precursor components in the mixture and the following equation allows for this possibility:

$$\sum_{h=0}^{m}\sum_{i=0}^{m} x_h \rho_i V_i + \sum_{j=1}^{p}\sum_{k=1}^{p} x_j m_k \xrightarrow{\Delta} \sum_{h=0}^{m}\sum_{k=1}^{p} m_h m_k$$

wherein $x_h$ is the mass fraction of the respective liquid components, $\rho_i$ is the density of the liquid precursor, $V_i$ is the volume of the component in the liquid precursor after the solvent evaporates, m is the number of the liquid components, p is the number of solid components, $m_k$ is the mass of the solid components in the precursor and $m_h$ and $m_k$ are the masses of the product derived from the solid and liquid components. Based upon the equation above the mass ratio equals:

$m_h/(m_h+m_k)$.

If the added seed particles are only partially decomposed, similar adjustments need to be made as indicated above.

For the specific example above, $$x\rho_A V_A + (1-x)m_B \xrightarrow{\Delta} m_A + m_B$$

wherein A and B are the respective components in the binary mixture, x and (1-x) are the respective mass fractions, which if they do not meet the minimum solid ratio criteria will lead to a hollow morphology. If the minimum a level is met, a sufficient amount of solids are provided in the droplets such that, even if some hollow shells form, enough solid particles will be formed so that the final product will be considered non-hollow. The ratio of $m_A$ and $m_B$ defines the composition of the final product irrespective of the interior hollow or non-hollow morphology of the product. It is believed the total mass fraction of solid-phase particles, a, may be as little as about 2% and still result in non-hollow product particles, with at least about 5% being preferable. Similarly, a total mass fraction of solid-phase particles, a, of as great as 75% as may be used to produce non-hollow product particles. In certain embodiments, the total mass fraction of solid-phase particles is as great as about 70%, 65%, 60%, 55%, or 50%. That said, it is believed and experimental results to date indicate that selecting the total mass fraction of solid-phase particles in the slurry to be between about 10% and about 70% will consistently result in particles having a non-hollow morphology (i.e., a≈10-70%), regardless of the particular composition being produced, including regardless of whether the composition is uniform or non-uniform or comprising multiple compositions. In another embodiment, the total mass fraction of solid-phase particles is selected to be between about 20% and about 60% (i.e., a≈20-60%).

In one embodiment of the present invention, the solid particles are a mixed metal oxide of $0.5Li_2MnO_3 \cdot 0.5LiNi_{0.333}Mn_{0.333}Co_{0.333}O_2$ and the precursor compounds in the precursor solution are lithium nitrate, nickel nitrate, manganese nitrate, and cobalt nitrate dissolved in water. The ratios of precursor compounds are such that their pyrolysis product has the same chemical composition as the solid particles, generating a final product powder with a single chemical composition ($0.5Li_2MnO_3 \cdot 0.5LiNi_{0.333}Mn_{0.333}Co_{0.333}O_2$). The mass of solid particles in the slurry was selected so that the mass ratio of solid particles to the final product was about 0.5.

2. Aerosolization of the Slurry into Droplets

The slurry is aerosolized to produce droplets comprising the slurry mixture suspended in a carrier gas. A number of aerosolization methods/equipment may be used, including but not limited to: two-fluid nozzles, ultrasonic nebulizers, rotary atomizers and high-pressure nozzles. A number of carrier gases may be used, depending on the chemical properties or the material being produced. Carrier gases include but are not limited to: air, argon, nitrogen, and mixtures of air and combustion products.

In one embodiment of the present invention, the slurry is aerosolized using a two-fluid nozzle. The slurry is pressure-fed to the nozzle and then aerosolized by high velocity air flow. The droplets are sprayed into a heated carrier gas comprising a mixture of air and combustion products.

3. Evaporation of the Solvent(s) from the Droplets

The solvent or mixture of solvents from the precursor solution evaporates from the droplet of slurry, creating a droplet or particle (depending on the phase of the precursor compounds and hereafter referred to as "droplet") comprised of solid particles and precursor compounds. To be clear, for embodiments involving a precursor liquid (which is distinct from a precursor solution as described above), a solvent is not evolved in this step.

In one embodiment of the present invention, water evaporates from the slurry droplet upon spraying into hot gas flow, briefly creating particles of mixed-metal oxides bound by metal nitrate salts (lithium nitrate, nickel nitrate, manganese nitrate, and cobalt nitrate).

4. Decomposition of Precursor Compounds into Pyrolysis Products

The droplets are heated to sufficient temperatures to induce decomposition (pyrolysis) of the precursor compounds into pyrolysis product. Required temperatures and durations of temperatures will vary with the precursor material being used and the desired level of precursor decomposition. For some slurries and temperature profiles, evaporation and decomposition will proceed so close together that they can be treated as a single step from a process-management perspective. Heat to promote pyrolysis can be provided by a number of means evident to one skilled in the art, including but not limited to: 1) heating the carrier gas with products of a "back flame" before it reaches the droplets, wherein hot combustion products of a flame mix with the carrier gas before the carrier gas/combustion product mixture (generally referred to simply as "carrier gas") reaches the aerosol, such that the flame is upstream in the process from the production of the aerosol; 2) heating the carrier gas in a heat exchanger or variation thereof before it reaches the droplets (e.g., moving the aerosol through a hot-wall reactor); 3) heating the droplets with side flames or with heated gas after aerosolization (e.g., combusting the slurry spray such as in cases where alcohol is used as a solvent in the precursor solution); and/or 4) passing the aerosol through a flame.

In one embodiment of the present invention, a back flame is used to heat air before it reaches the space around the nozzle. In the back flame, static mixers (upstream of the nozzle) mix air and combustion products to provide a heated carrier gas that passes to the nozzle. The aerosol of slurry droplets is sprayed into this hot carrier gas where the solvent evaporates and metal nitrates of the precursor fully or partially decompose to form new mixed-metal oxides. The new oxides form between and around the solid particles of oxides from the slurry, filling in voids to produce a porous, non-hollow material with a uniform chemical composition. In a specific embodiment, this product powder is comprised of $0.5Li_2MnO_3 \cdot 0.5LiNi_{0.333}Mn_{0.333}Co_{0.333}O_2$.

In another embodiment, an air-excess burner (e.g., Eclipse ThermJet Burners Model TJ0200) may be used as the heat source for the process. An air-excess burner provides a high velocity flame with the temperature flexibility. In particular, using propane as the fuel allows the flame to reach, for example, a target temperature of 600° C. at 400% excess air.

Additionally, the entire spray pyrolysis system may comprise components or equipment for thermal management to control the evaporation and decomposition. For example, one may use a cooling water coil and ceramic insulation materials and a surrounding honeycomb, so that droplets will undergo evaporation and decomposition under a uniform heat flow.

5. Collection of the Product Particles from the Gas Stream

Product particles are collected from the carrier gas by any appropriate method. In one embodiment of the present invention, a bag house filter is used to separate the product particles from the gas stream. It is understood that one skilled in powder collection methods may use instruments such as cyclones or other air-particle separation units to collect the particles.

D. Spray Pyrolysis Apparatus Embodiment

Figure 5:
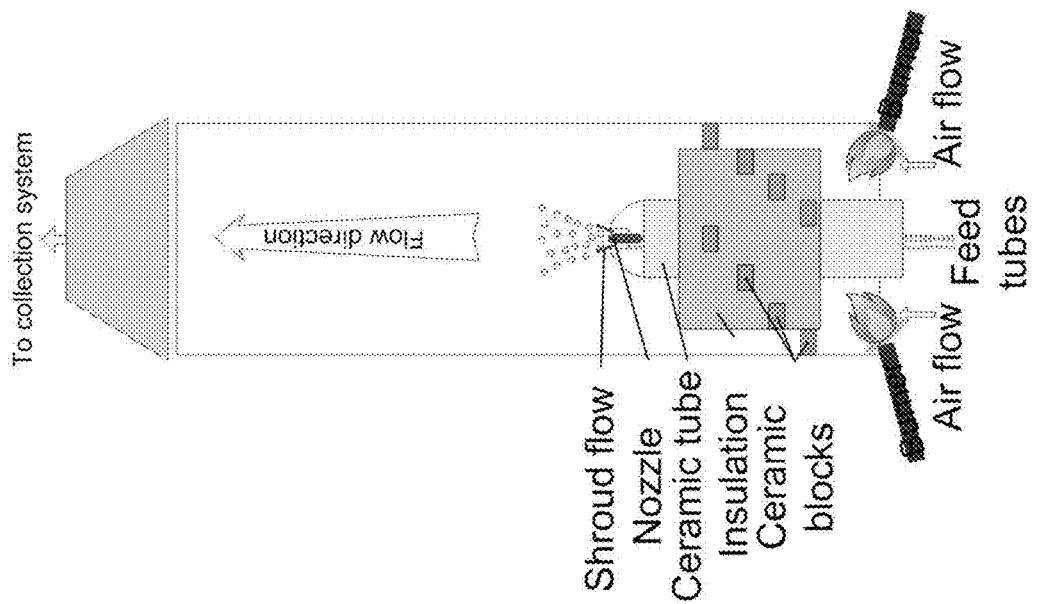
FIG. 5 is a schematic diagram depicting a "back flame" spray pyrolysis reactor, which may be used in conducting an embodiment of the present invention.

One embodiment of a spray pyrolysis apparatus is depicted in FIG. 5. The apparatus comprises four sections. A bottom section measuring approximately 18 inches (45 cm) across, in which heat is produced by two air-propane burners located tangentially and opposite to one another in the bottom of the unit. By way of an example in this section, air flow is mixed by ceramic blocks attached to the system walls and serve as a static mixer to form a uniform gas temperature. Feed tubes for the nozzle assembly that pass through the center of this section are protected from the heated environment by a three-inch diameter ceramic tube, several layers of insulation, and an air-cooling purge. The open cross section of the first section is designed to allow for an airflow of approximately 60 cubic feet per minutes utilizing the stack effect. A second section features a two fluid nozzle (Delavan siphon type SNA) pointing upward and coupled with a shroud air flow protecting the nozzle from the high temperature of the gasses rising from the first section. The third section is an eight inch (20 cm) diameter tube measuring approximately 60 inches (152 cm) long. The aerosol flows through this section while mixing with the hot gases such that material drying (evaporation of solvents) and decomposition occurs. The last section of the system is a bag house filter maintained at approximately 100° C. to collect the product and avoid condensation. The filter's inlet is located above the third section exit but not connected to it. The bag house filter utilizes an air blower with a maximum flow capacity of 100 cubic feet per minute (2.8 m³/min) to generate a pressure differential across the filtering membranes. Gas temperature is measured by type K thermocouples in the second section (at nozzle height) and in the exit from the third section. The fuel flow to the burners is adjusted to create a gas temperature of approximately 600° C. in section two and 400° C. in the exit from section three. Slurry is fed to the nozzle from a slightly pressurized Erlenmeyer flask.

Example

Production of Metal Oxides by Spray Pyrolysis for Use in the Creation of Slurry 2.5 mole $L^{-1}$ precursor was prepared by fully dissolving $LiNO_3$, $Mn(NO_3)_2 \cdot 4H_2O$, $Ni(NO_3)_2 \cdot 6H_2O$, $Co(NO_3)_2 \cdot 6H_2O$ in deionized water. The concentrations of $LiNO_3$, $Mn(NO_3)_2$, $Ni(NO_3)_2$ and $Co(NO_3)_2$ were 1.5 mole $L^{-1}$, 0.67 mole $L^{-1}$, 0.17 mole $L^{-1}$ and 0.17 mole $L^{-1}$, respectively.

For the production of metal oxides (for use as the solid-phase particles in the slurry), the precursor was sprayed in a spray pyrolysis apparatus utilizing flame to produce heat for drying and decomposing atomized material. The apparatus comprises of four sections. A bottom section measuring approximately 18 inches in which heat is produced by six air-propane burners pointing upward. The feed tubes bearing gas and liquid for the nozzle are located in the center of this section and are protected from the heated environment by several layers of insulation. The first 6 inches of this section are open to atmosphere while the top 12 inches are shielded by a cone that is connected at its narrow end to section three. The second section features a two fluid nozzle (Delavan siphon type SNA) pointing upward and coupled with a shroud air flow protecting the nozzle from the high temperature of the gases rising from the first section. During production, the nozzle air pressure was adjusted to 9.5 psi while the shroud was set to a sufficient air flow to allow for continuous spraying. The third section is a 4 inch wide tube measuring approximately 36 inches long. The aerosol flows through this section while mixing with the hot gasses such that material drying (evaporation of solvents) and decomposition occurs. The open cross section of this section allows for an air flow of approximately 60 cubic feet per minutes utilizing stack effect. The last section of the system is a bag house filter to collect the product. It is maintained at approximately 100° C. avoid liquid condensation. The filter's inlet is located above the third section exit but not connected to it. The bag house filter utilizes an air blower with a maximum flow capacity of 100 cubic feet per minute to generate a pressure differential across the filtering membranes. Flow temperature was measured by type K thermocouples in the exit from the third section. The fuel flow to the burners was adjusted to keep the temperature in the range of approximately 415° C. to 445° C. in the exit from section three. Precursor solution was fed to the nozzle from a slightly pressurized tank and the flow was measured by a flow meter and adjusted to 5 sccm with a needle valve.

By controlling the residence time and temperature, we are able to control the level of decomposition and influence the properties of the final product (including primary particle size and mechanical properties). The material produced by the method described in this section was not fully decomposed.

For reference purposes a 5 g sample was taken out of this material and annealed for 2 hours in 900° C. After annealing the sample weight was 3.13 g. The sample was sieved on mesh number 70 (212 micron opening size). 3.12 g of the sieved material was analyzed with tap density analyzer (Quantachrome instruments Autotap) yielding a tap density of 0.69 g/cc.

SEM images (SEM FEI Nova 2300 Field Emission) of this material revealed that most of the particles are spherical with a hollow interior (see FIG. 1). Some of the particles are broken and/or deformed.

Slurry Preparation

To tune the degree of decomposition to the desired level prior to additional processing, 80 g of material were loaded into an alumina crucible and heat treated. The material was ramped up to 450° C. in 45 minutes, held at 450° C. for 30 minutes and then naturally cooled back to room temperature. The sample lost approximately 10% of its weight in the heat treatment process. The heat treatment can be skipped if the material is already at the desired level of decomposition in its as-produced form.

67 g of heat treated material were ground with a mortar and pestle. The material was ground in 5 batches for approximately 12 minutes per batch.

54 g of milled material were mixed with 270 ml of precursor solution of the same composition described in the preceding "Production of metal oxides" section. Slurry was homogenized for approximately 3 minutes with a high speed homogenizing mixer at approximately 1000 rpm. The mass of solid particles to be put in the slurry was chosen so that the mass fraction of old material in the final product will be 0.65.

Spray Pyrolysis of Slurry

The slurry material was produced in a spray pyrolysis apparatus similar to the one used for the production of raw material and described in the preceding "Production of metal oxides" section of Example 1, but with the following changes: the slurry was fed to the nozzle from a magnetically stirred Erlenmeyer flask. The slurry in the Erlenmeyer flask was kept under air pressure to allow for average slurry feed rate of approximately 20 sccm. The fuel flow to the burners was adjusted to keep the temperature at approximately 400° C. in the exit from section three.

5 g sample was taken out of this material and annealed for 2 hours in 900° C. After annealing the sample weight was 3.07 g. The sample was sieved on mesh number 70 (212 micron opening size). 3.06 g of the sieved material was analyzed with tap density analyzer (Quantachrome instruments Autotap) yielding a tap density of 0.93 g/cc.

As a side demonstration, a portion of this annealed material was pressed to a puck density of 1.57 g/cc in a hydraulic press to disrupt agglomeration that might occur during the annealing process. After re-sieving, the pressed material yielded a tap density of 1.06 g/cc. SEM images (SEM FEI Nova 2300 Field Emission) of the annealed and sieved material revealed that most of the particles are not spherical but approximately equiaxed in shape. Only a minority of the particles looked deformed or had any surface indication of being hollow. The particles were frequently larger than 2 micron. (see FIG. 6)

To analyze the interior structure of the product, the particles were embedded in an epoxy-based resin (Ted Pella). The following day, sections were cut from the dry resin using a Leica ultramicrotome. The interior of the particles was observed by SEM (SEM FEI Nova 2300 Field Emission). These images confirm that the vast majority of particles have a non-hollow interior morphology (see FIG. 7).

Electrochemical Testing

Cathode film fabrication was done according to procedures reported elsewhere. "Spray Pyrolysis Synthesis of Mesoporous Lithium-Nickel-Manganese-Oxides for High Energy Li-Ion Batteries," X. Zhang, R. L. Axelbaum, *J. Electrochem. Soc.*, 159 (6), A834 (2012). The cathode slurry was prepared using polyvinylidene fluoride (PVdF) binder solution (Kureha Corp. Japan) and Super-P conductive carbon black (Timcal) suspended in 1-Methyl-2-pyrrolidinone (NMP). Half-cells were assembled for the electrochemical tests using pure lithium anodes and 2500 Celgard trademark membranes (Celgard LLC). The electrolyte solution was 1.2 M $LiPF_6$ in ethylene carbonate/ethyl-methyl-carbonate solution (EC:EMC=3:7 by weight) (Tomiyama High Purity Chemicals, provided by Argonne National Laboratory).

Figure 8:
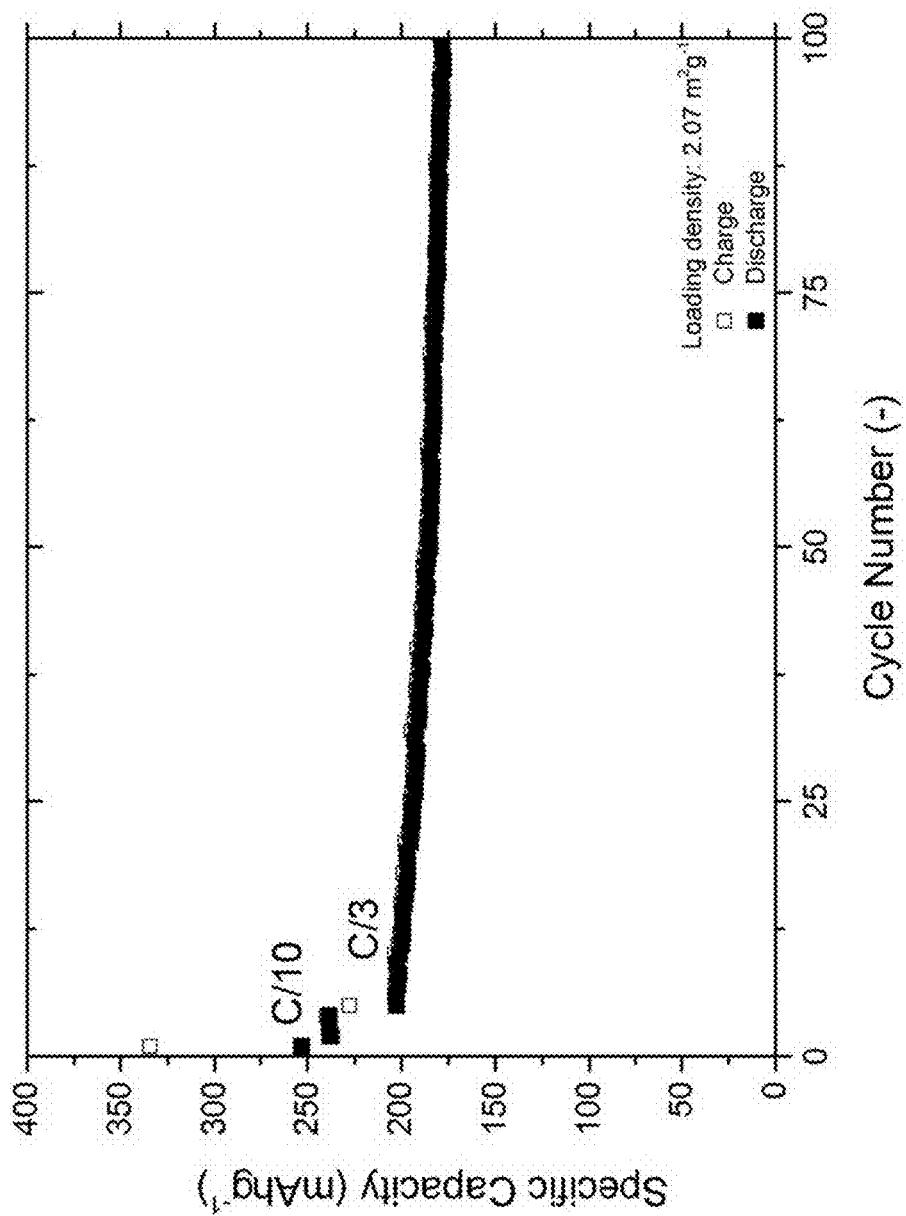
FIG. 8 is a graph showing results of cycle testing half-cell performance versus a lithium anode of slurry product from 2012 Dec. 14 batch.
Figure 9:
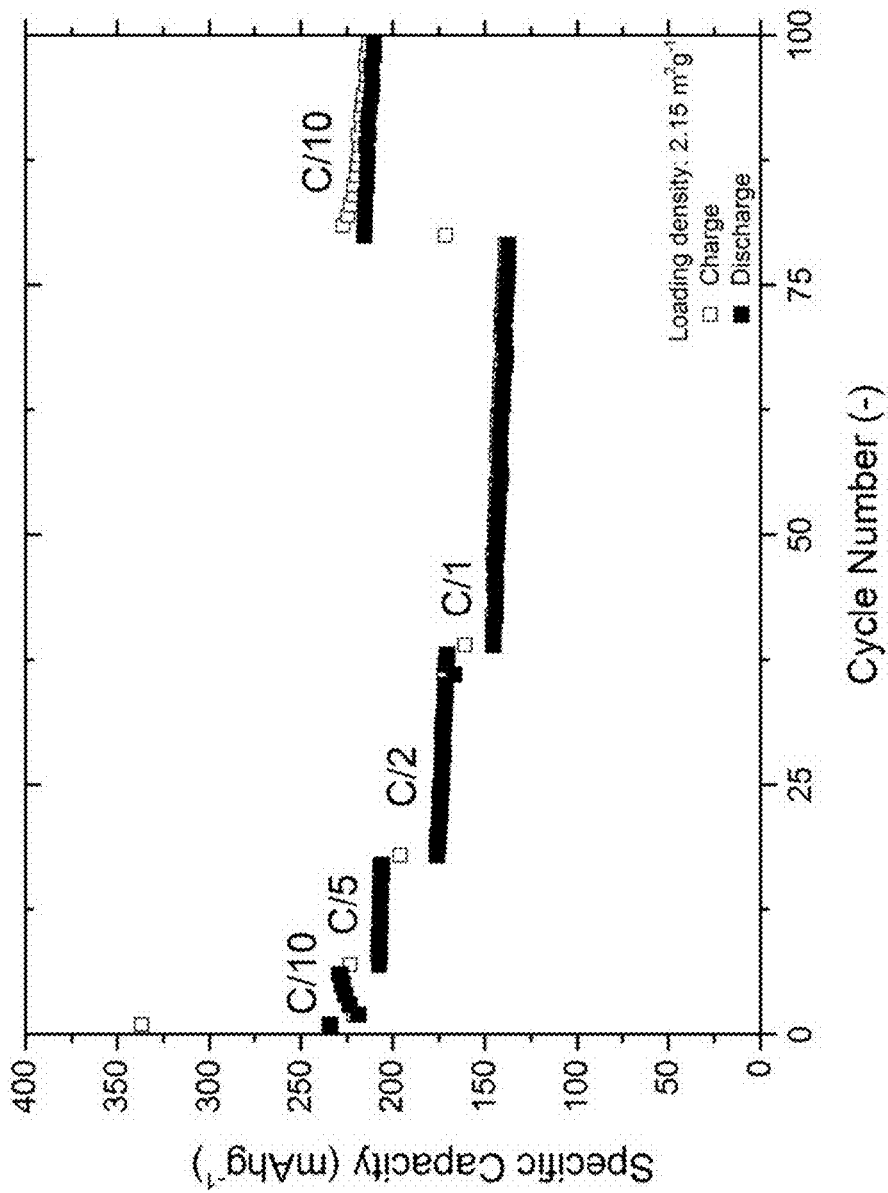
FIG. 9 is a graph showing results of rate capability testing half-cell performance versus a lithium anode of slurry product from 2012 Dec. 14 batch.

Electrochemical performance of the powders was evaluated in 2032-type coin cells (Hohsen Corporation) assembled in an argon-filled glove box. Cycling tests and rate capability tests were performed according to the procedures listed in Table A. Both cycling and rate capability tests were performed using an MTI-BST8-WA-type battery tester. All the electrochemical tests were performed at room temperature, 22° C. Results of the cycle testing protocol are included in FIG. 8. Notably, the first discharge displayed a capacity of 254 mAh/g when discharged at a rate of 20 $mAg^{-1}$. The fifth cycle, featuring a 66.67 $mAg^{-1}$ discharge rate, had a discharge capacity of 200 $mAhg^{-1}$. Results of the cycle testing protocol are included in FIG. 9.

Figure 10:
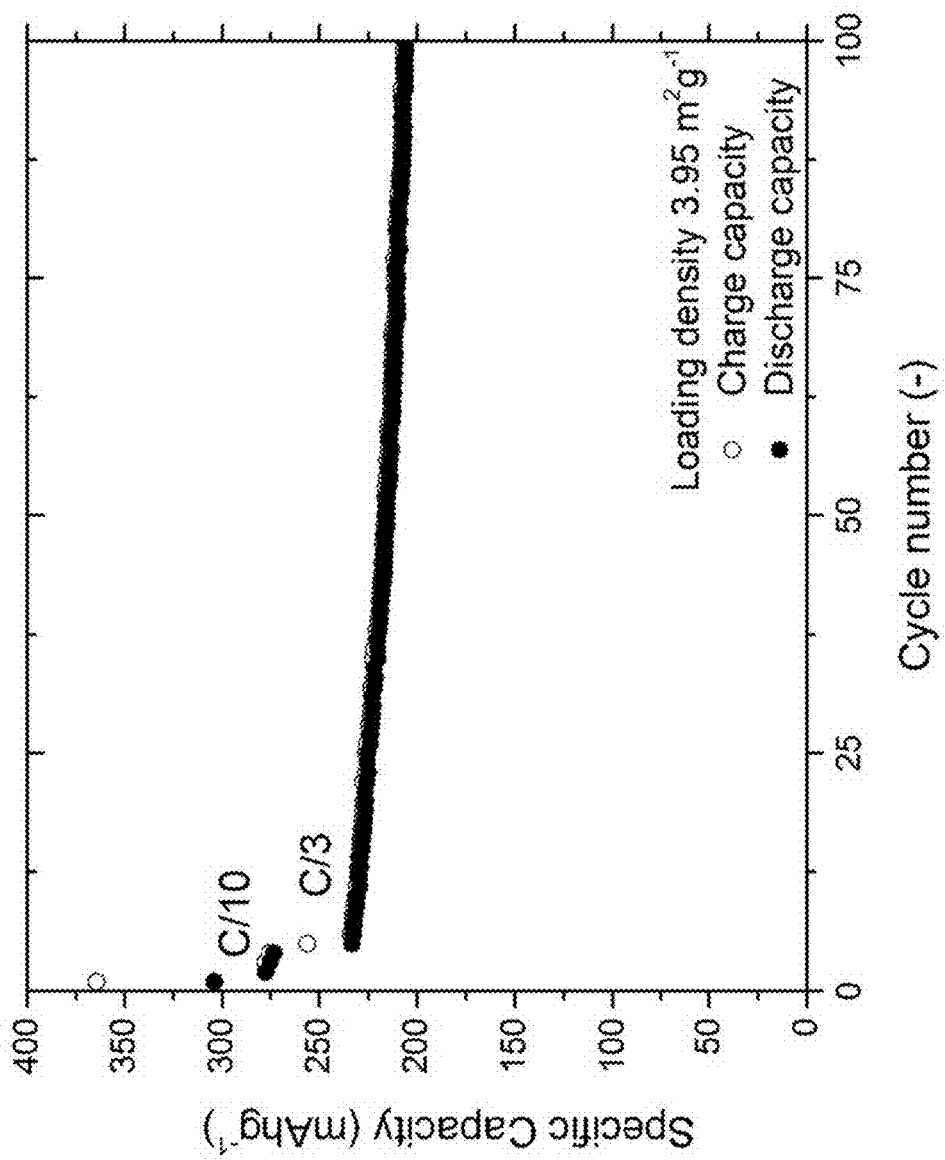
FIG. 10 is a graph showing results of cycle testing half-cell performance versus a lithium anode of slurry product from 2013 Feb. 6 batch.
Figure 11:
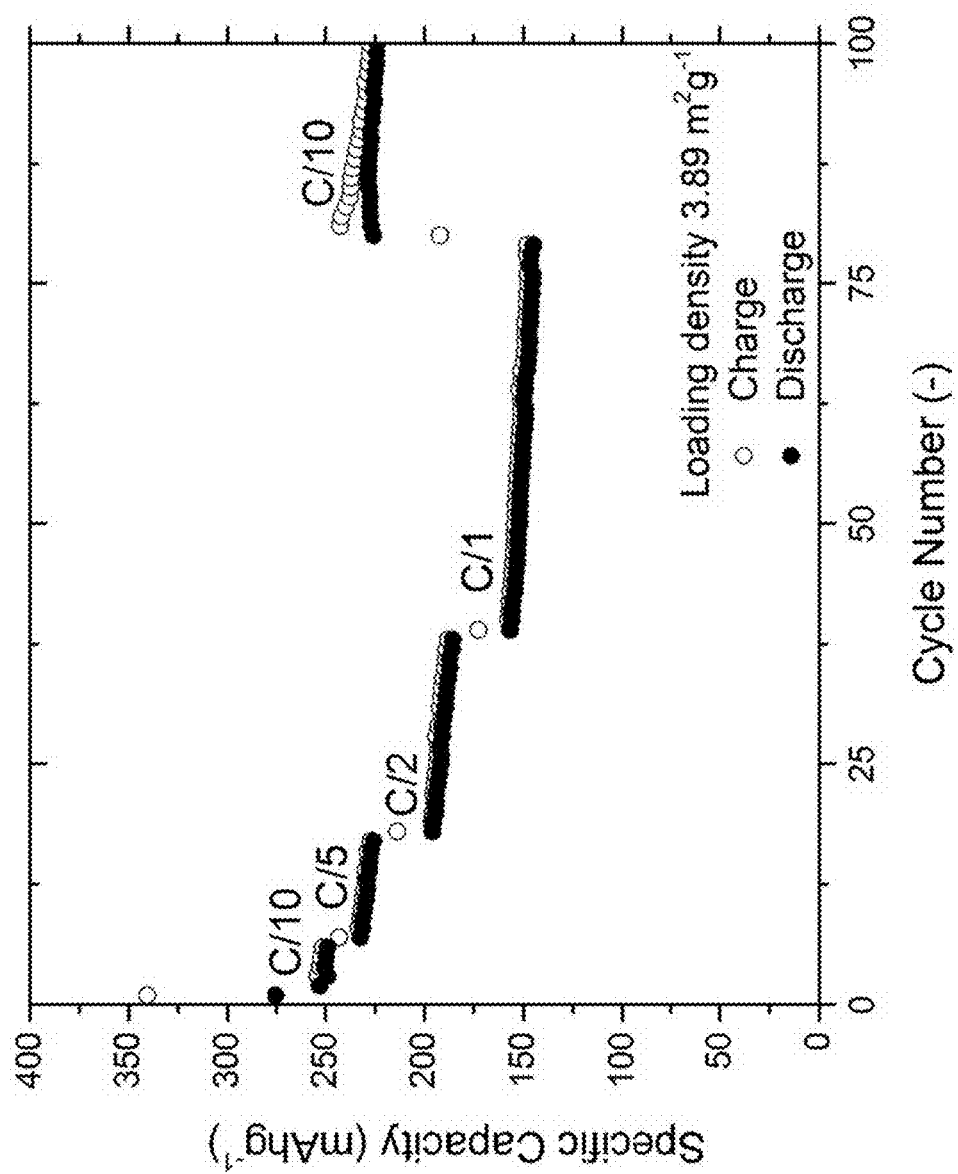
FIG. 11 is a graph showing results of rate capability testing half-cell performance versus a lithium anode of slurry product from 2013 Feb. 6 batch.

Additionally, preliminary cycling and rate testing data for a batch of cathode materials of the same chemical composition produced on 2013 Feb. 6 using the methods described in the present invention are included in FIGS. 10 and 11, respectively. Under the same testing protocols, these materials showed a higher initial charge capacity of over 300 mAh/g and a discharge capacity of over 225 $mAhg^{-1}$ at the C/3 rate (66.67 $mAg^{-1}$).

TABLE A

|  | Cycling test protocol (1 C = 200 $mAhg^{-1}$) | Rate capability test protocol (1 C = 200 $mAhg^{-1}$) |
| --- | --- | --- |
| Activation | 1 cycle 2.0-4.8 V at C/10 (20 $mAg^{-1}$) | 1 cycle 2.0-4.8 V at C/10 (20 $mAg^{-1}$) 4 cycles 2.0-4.6 V at C/10 (20 $mAg^{-1}$) |
| Subsequent cycles | 3 cycles 2.0-4.6 V at C/10 (20 $mAg^{-1}$) 96 cycles 2.0-4.6 V at C/3 (66.67 $mAg^{-1}$) | 10 cycles 2.0-4.6 V at C/5 (40 $mAg^{-1}$) 20 cycles 2.0-4.6 V at C/2 (100 $mAg^{-1}$) 40 cycles 2.0-4.6 V at 1 C (200 $mAg^{-1}$) 25 cycles 2.0-4.6 V at C/10 (20 $mAg^{-1}$) |

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All ranges discussed can and do necessarily also describe all subranges therein for all purposes and that all such subranges are part this invention. Any listed range can be easily recognized as sufficiently describing and enabling the same range being broken down into at least equal halves (e.g., a lower half and upper half), thirds, quarters, tenths, etc.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A material comprising a plurality of mesoporous, metal oxide-containing secondary particles with a non-hollow morphology and a mean size that is in a range of about 1 µm to about 15 µm, wherein the secondary particles comprise primary particles with a mean size that is in a range of about 50 nm to about 500 nm, wherein the material is produced by spray pyrolysis, the spray pyrolysis comprising aerosolizing a slurry that comprises solid-phase particles and a metal-oxide containing powder, wherein the slurry has a total mass fraction of solid-phase particles to metal oxide-containing powder that is in a range of about 2% to about 75%.

2. The material of claim 1, wherein the mean size of the secondary particles in a range of about 4 µm to about µm, wherein the standard deviation with respect to the median size for the secondary particles is in the range about 0 to about 10, wherein the secondary particles have an inter-primary particle spacing that is in the range of about 2 nm to about 100 nm, and wherein the secondary particles have a Brunnauer-Emmett-Teller surface area that is in the range of about 1 m$^2$/g to about 100 m$^2$/g.

3. The material of claim 1, wherein the relative concentration of each element within any 1 micrometer region of the material does not vary more than about 4% from the mean and that the standard deviation throughout the material is no greater than about 4%.

4. The material of claim 1, wherein the metal oxide has a general chemical formula $Li_{1+\alpha}(Ni_xCo_yMn_z)_{1-t}M_tO_{2-d}R_d$ wherein: M is selected from a group consisting of Al, Mg, Fe, Cu, Zn, Cr, Ag, Ca, Na, K, In, Ga, Ge, V, Mo, Nb, Si, Ti, Zr, and mixtures thereof; R is selected from a group consisting of F, Cl, Br, I, H, S, N, O and mixtures thereof; and $0 \leq \alpha \leq 0.50$; $0 < x \leq 1$; $0 \leq y \leq 1$; $0 < z \leq 1$; 0, $0 \leq t \leq 1$; and $0 \leq d \leq 0.5$; and wherein the primary particles comprise $Li_{1+\alpha}Ni_xMn_zO_2$, wherein $0 \leq \alpha \leq 0.2$, $0.1 \leq x \leq 0.6$, and $0.2 \leq z \leq 0.6$.

5. The material of claim 1, wherein the metal oxide has a composite chemical formula $xLi_2MO_3 \cdot (1-x)LiM'O_2$, wherein: M is one or more metallic ions having an average oxidation state of +4; and M' is one or more metallic ions have an average oxidation state of +3; and $0 < x < 1$.

6. The material of claim 5, wherein the metal oxide composite formula is $xLi_2MnO_3 \cdot (1-z)LiMn_{0.5}Ni_{0.5}O_2$ and $0.3 \leq x \leq 0.7$.

7. The material of claim 6, wherein x=0.3 and the metal oxide has a layered-layered composite structure.

8. The material of claim 5, wherein the metal oxide composite formula is $xLi_2MnO_3 \cdot (1-x)LiCoO_2$ and $0.3 \leq x \leq 0.7$.

9. The material of claim 5, wherein the metal oxide composite formula is $xLi_2MnO_3 \cdot (1-z)LiMn_{1/3}Ni_{1/3}Co_{1/3}O_2$ and $0.3 \leq x \leq 0.7$.

10. The material of claim 5, wherein the metal oxide has a layered-layered composite crystal structure.

11. The material of claim 5, wherein the metal oxide comprises a layered-spinel composite crystal structure.

12. The material of claim 5, wherein the metal oxide comprises a spinel-type (LT-LiCoO$_2$-type) crystal structure.

13. The material of claim 5, wherein the metal oxide comprises a monoclinic Li$_2$MnO$_3$-type crystal structure.

* * * * *